(12) United States Patent
Jaouen et al.

(10) Patent No.: US 6,670,686 B2
(45) Date of Patent: Dec. 30, 2003

(54) INTEGRATED SOUND TRANSMITTER AND RECEIVER, AND CORRESPONDING METHOD FOR MAKING SAME

(75) Inventors: Hervé Jaouen, Meylan (FR); Thomas Skotnicki, Crolles-Montfort (FR); Malgorzata Jurczak, Grenoble (FR)

(73) Assignee: STMicroelectronics SA, Montrouge (FR)

( * ) Notice: Subject to any disclaimer, the term of this patent is extended or adjusted under 35 U.S.C. 154(b) by 0 days.

(21) Appl. No.: 10/149,088

(22) PCT Filed: Dec. 6, 2000

(86) PCT No.: PCT/FR00/03408

§ 371 (c)(1),
(2), (4) Date: Sep. 16, 2002

(87) PCT Pub. No.: WO01/42724

PCT Pub. Date: Jun. 14, 2001

(65) Prior Publication Data

US 2003/0052355 A1 Mar. 20, 2003

(30) Foreign Application Priority Data

Dec. 7, 1999 (FR) .............................................. 99 15410

Mar. 20, 2000 (FR) .............................................. 00 03547

(51) Int. Cl.$^7$ ................................................ H01L 29/82
(52) U.S. Cl. ........................................ 257/416; 257/415
(58) Field of Search .................................. 257/415, 416

(56) References Cited

U.S. PATENT DOCUMENTS 4,202,128 A * 5/1980 Hill et al. ................... 43/43.14
5,260,596 A * 11/1993 Dunn et al. ................. 257/414
5,659,195 A * 8/1997 Kaiser et al. ............... 257/415

* cited by examiner

Primary Examiner—Ngân V. Ngô
(74) Attorney, Agent, or Firm—Lisa K. Jorgenson; Allen, Dyer, Doppelt, Milbrath & Gilchrist, P.A.

(57) ABSTRACT

A transmitter or receiver includes several transducers formed opposite an aperture in a package. Each transducer includes a deformable semiconductor membrane that is capable of conducting current. The membrane is separated from a substrate zone by a cavity. This allows the membrane to deform due to the effect of an acoustic pressure or of a Lorenz force.

34 Claims, 6 Drawing Sheets

INTEGRATED SOUND TRANSMITTER AND RECEIVER, AND CORRESPONDING METHOD FOR MAKING SAME

FIELD OF THE INVENTION

The present invention relates to integrated circuits, and more particularly, to an integrated semiconductor acoustic transducer operating in the ultrasonic range, and to a corresponding fabrication process.

BACKGROUND OF THE INVENTION

At the present time, acoustic transmitters/receivers operating in the ultrasonic range can not be integrated on a semiconductor chip. This is because an acoustic transmitter/receiver relies on the piezoelectric effect which deforms a thin layer of material due to the effect of an electric field. Furthermore, suitable material is generally a quartz plate which can not be integrated using semiconductor technology.

SUMMARY OF THE INVENTION

In view of the foregoing background, an object of the present invention is to provide an integrated semiconductor acoustic transducer.

This and other objects, advantages and features according to the present invention are provided by an integrated semiconductor acoustic transducer comprising, in general, a deformable semiconductor membrane capable of conducting an electric current. The membrane is separated from one zone of a semiconductor substrate by a cavity, thus allowing the membrane to deform.

The substrate is generally made of silicon. Moreover, the membrane is preferably formed from doped silicon so as to allow easier flow of the current therethrough. According to one embodiment, the height of the cavity is on the order of ten nanometers, while the length of the membrane is on the order of a hundred micrometers. These dimensions are particularly suitable for an ultrasound application of the transducer, thus allowing a resonant frequency of about 30 MHz in the case of the membrane, and about 1 MHz in the case of the cavity. This gives the transducer an operating range between 1 and 30 MHz.

According to the invention, the transducer can be used both as an element of an acoustic receiver, and as an element of an acoustic transmitter. When it is used as an acoustic sensor (an element of an acoustic receiver), the transducer advantageously comprises a capacitor having a first plate formed by the semiconductor membrane capable of conducting an electric current and able to deform due to the effect of an acoustic pressure. The pressure variations result from sound propagating through the open air and striking the membrane. The capacitor also includes a second plate formed by a doped zone of the semiconductor substrate and placed opposite the membrane. The cavity separating the two plates then contains, for example, a layer of dielectric gas, such as air, for example.

The invention also provides an acoustic receiver comprising a semiconductor substrate containing at least one transducer as defined above, together with current-generating means capable of generating the current in the membrane of the transducer. The acoustic receiver may further comprise detection means connected to the capacitor for detecting the variations in the capacitance of the capacitor caused by the deformations of the membrane.

When the transducer according to the invention is used as an element of an acoustic transmitter, the semiconductor membrane capable of conducting a modulated electric current is advantageously deformed due to the effect of the Lorenz force. This force is generated by a magnetic field lying in the plane of the membrane, and perpendicular to the lines of current.

The invention also provides an acoustic transmitter comprising a semiconductor substrate including at least one transducer as defined above, together with current-generating means capable of generating a modulated current in the membrane. The acoustic transmitter may further comprise means for generating a magnetic field which is capable of generating the magnetic field lying in the plane of the membrane, and perpendicular to the lines of current. The magnetic field may be generated with a U-shaped magnet, for example.

The invention also provides a process for fabricating an integrated semiconductor acoustic transducer comprising a deformable semiconductor membrane separated from one zone of a semiconductor substrate by a cavity allowing the membrane to deform. The process comprises making, in the substrate, an isolation region defining a semiconductor region called the active region.

The method further comprises depositing, by selective epitaxy on the surface of the active region, a first layer of a first material, for example germanium or a silicon-germanium alloy. The method further comprises depositing, by non-selective epitaxy on the first layer and on the isolating region, a second layer of a second semiconductor material (for example, silicon). The first material is selectively removable with respect to the second material.

The method further comprises locally etching the second layer, the first layer and part of the active region so as to form two lateral trenches which leave a central stack comprising a part of the second layer, a part of the first layer and a part of the active region and which reveal the part of the first layer along two opposed lateral sides of the stack. The part of the first layer is selectively removed from the sides so as to form the cavity which is bounded by the adjacent part of the substrate (forming the zone of the substrate) and the remaining part of the second layer (which forms the membrane). Lateral spacers are formed to close off the cavity beneath the membrane.

BRIEF DESCRIPTION OF THE DRAWINGS

Further advantages and characteristics of the invention will appear upon examination of the detailed description of embodiments and methods of implementation, which are entirely non-limiting, and of the appended drawings in which.

DETAILED DESCRIPTION OF THE PREFERRED EMBODIMENTS

Figure 1:
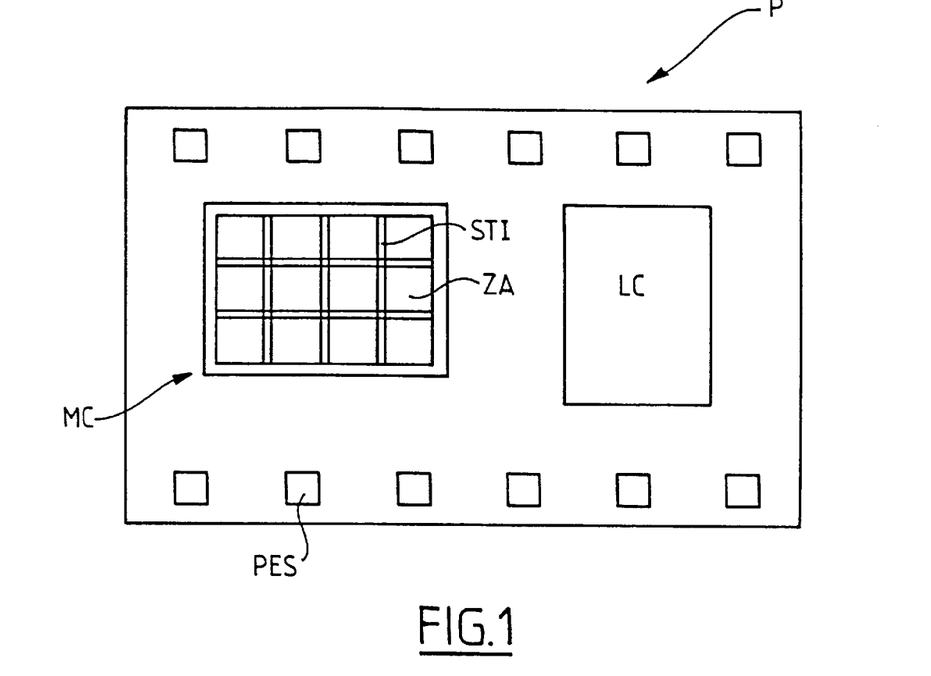
FIG. 1 illustrates schematically a semiconductor chip comprising a matrix of acoustic transducers according to the present invention.

In FIG. 1, the reference P denotes a semiconductor chip or wafer comprising a substrate, for example, made of silicon. This chip P has several regions called active regions ZA, which are mutually isolated by isolation regions STI. These isolation regions STI are, for example, isolating trenches conventionally produced by a shallow trench isolation process, as readily known by one skilled in the art. As will be explained in greater detail below, it is within each of the active regions ZA that an acoustic transducer will be produced. The acoustic transducer will be used either to receive ultrasound or to transmit ultrasound.

The chip P comprises a control logic unit LC that is associated with a matrix of transducers MC. The control logic unit LC comprises data processing circuits suitable for this application. The control logic unit may comprise, as will be seen in greater detail below, an oscillator, a modulator and a processor for processing the signals.

Moreover, the chip P conventionally includes, input/output pads PES along its edges. These input/output pads are connected via metal tracks and interconnection vias to the various elements of the chip.

Figure 2:
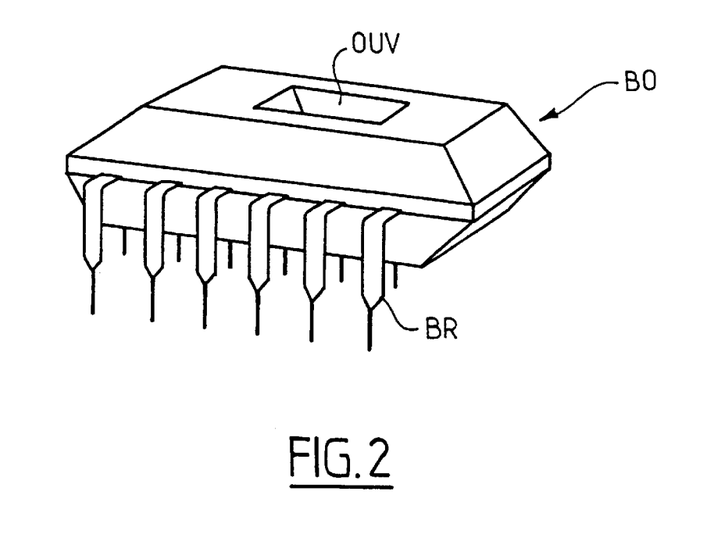
FIG. 2 illustrates schematically a package containing a chip as illustrated in FIG. 1.

The chip P is intended to be incorporated into a package BO, like the one illustrated in FIG. 2, which conventionally comprises a resin encapsulation for encapsulating the integrated circuit produced on the chip P. Pins BR are conventionally connected to the input/output pads PES on the chip.

The package BO also includes an aperture OUV which is made opposite the matrix MC of transducers. Thus, when the package BO contains an acoustic transmitter, the sound produced by the matrix of transducers MC can propagate through the aperture OUV to the open air. Likewise, when the package BO contains an acoustic receiver, the aperture OUV allows the sound propagating open air to strike the membranes of the transducers of the matrix MC.

As will be seen in greater detail below, a transducer intended to be incorporated into an acoustic transmitter uses the principle of the Lorenz force. More specifically, a transducer according to the invention comprises a deformable membrane. A current I is intended to flow in the membrane. Moreover, the latter is subjected to the effect of a magnetic induction lying in the plane of the membrane, perpendicular to the lines of current. Consequently, a force normal to the surface of the membrane (the Lorenz force) is generated and this deforms the membrane. This deformation will generate a sound if the current I flowing in the membrane is modulated.

Figure 3:
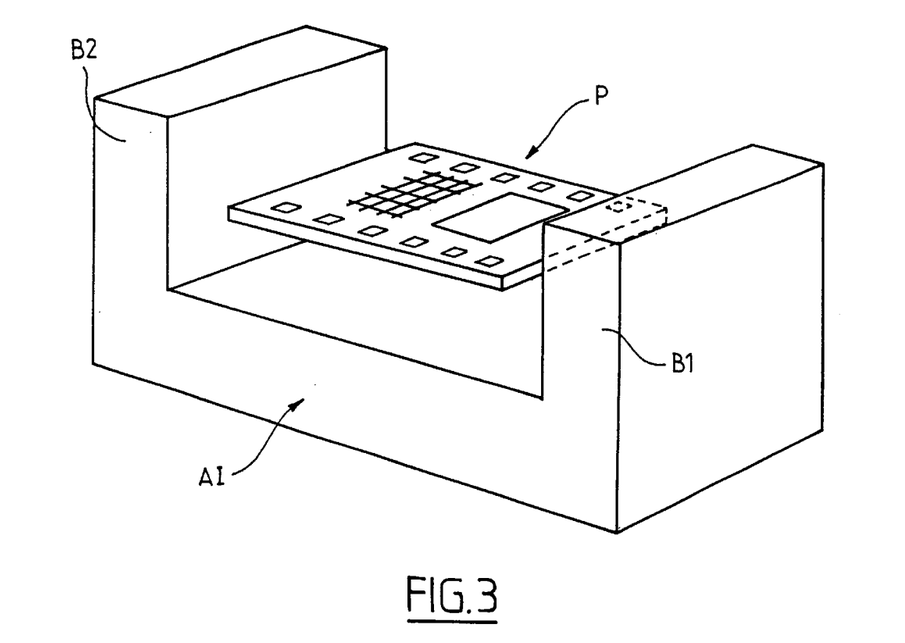
FIG. 3 illustrates an arrangement comprising a U-shaped magnet cooperating with a chip including a matrix of transducers according to the present invention.

In FIG. 3, the reference AI denotes a U-shaped magnet, which is one particularly straightforward way of generating a magnetic field. The magnetic field extends from one arm of the U, for example, the arm B1 of the magnet to the other arm of the U, for example, the arm B2 in the plane of the chip P. As will be seen in greater detail below, the current will flow in the membranes of the transducers perpendicular to the magnetic field lines.

Figure 4:
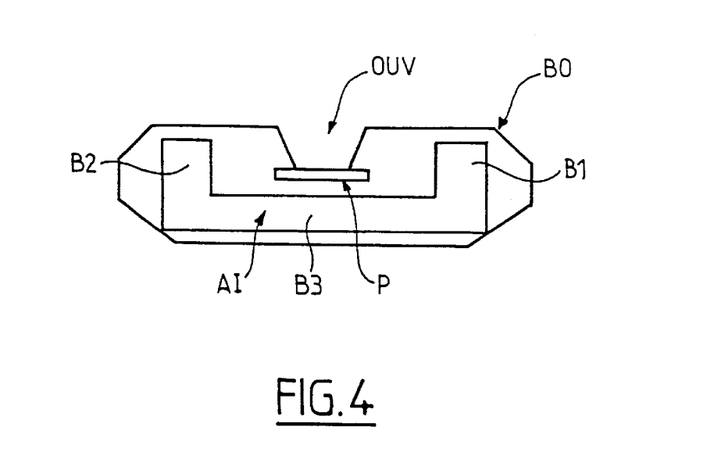
FIG. 4 illustrates schematically the arrangement in FIG. 3 incorporated into a package.

As may be seen in FIG. 4, the U-shaped magnet AI is also incorporated into the package, with the horizontal arm of the U-shaped magnet being located beneath the chip P. The latter is placed so that the matrix MC of transducers lies opposite the aperture OUV. The whole assembly is solidly held together by the resin encapsulation.

Figure 5:
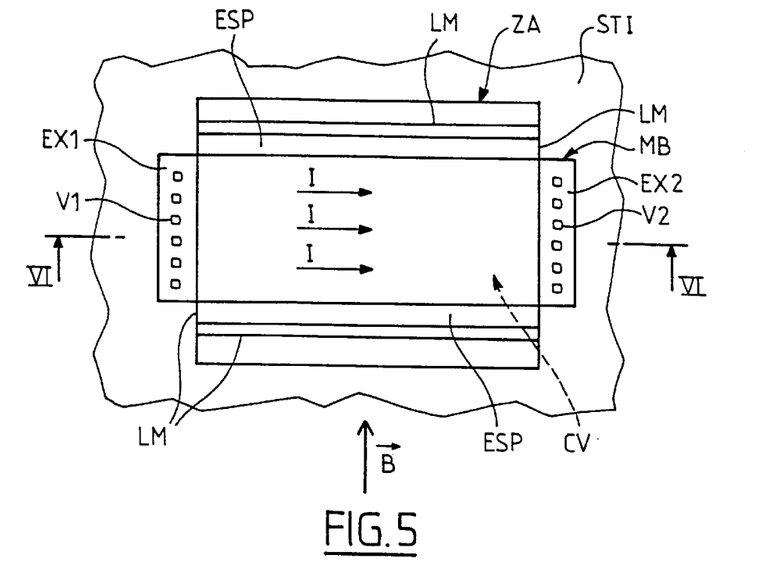
FIGS. 5 and 6 illustrate schematically one embodiment of an acoustic transducer, and more particularly, one that is to be incorporated into an acoustic transmitter according to the present invention.
Figure 6:
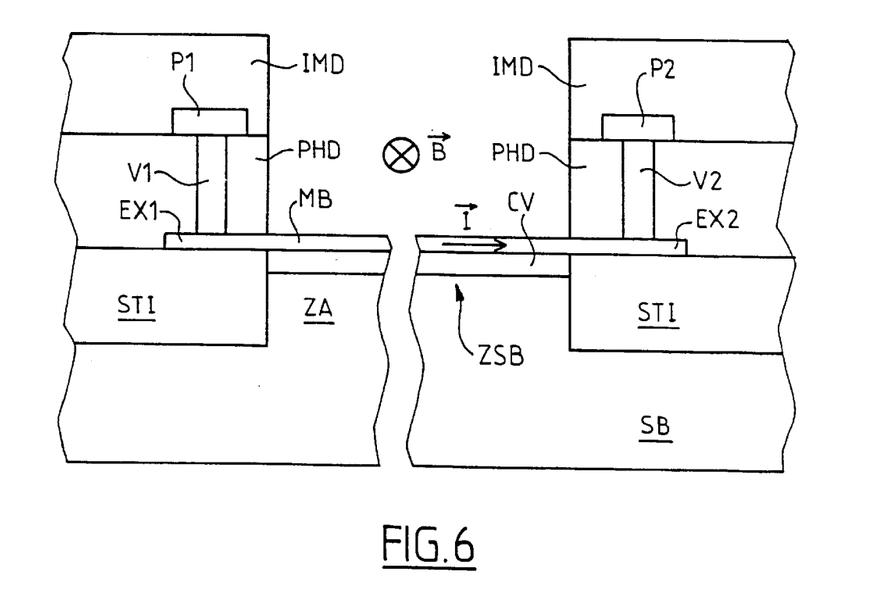

FIGS. 5 and 6 schematically illustrate a top view and a sectional view on the line VI—VI of a transducer incorporated into an acoustic transmitter. The active region ZA extends, within the silicon substrate SB, between a peripheral isolation region STI. A membrane MB, for example, also made of silicon and is thin enough to be deformed, lies above the active region ZA and rests at two of its ends EX1, EX2 on the peripheral isolation region STI.

The lower surface of the membrane MB, that is, the surface which is located opposite the upper surface of the active region ZA, is separated from this active region by a cavity CV. This cavity CV is closed off to the sides by isolation regions or spacers ESP which, as will be seen in greater detail below, are made in lateral trenches produced in the active region ZA.

For a current I to flow more easily in the membrane MB, the latter is advantageously doped. Consequently, especially if the doping of the membrane MB is done by implantation, the substrate zone ZSB located opposite the membrane is also doped. This is done although the doping of this zone ZSB is not absolutely essential for the operation of the acoustic transducer.

The transducer also includes several electrical contact pads or vias V1 which come into contact with one of the two ends of the membrane resting on the isolation peripheral region, for example, the end EX1. Likewise, several other electrical contact pads V2 are provided which come into contact with the other end of the membrane EX2 resting on the isolation peripheral region STI. Although it would be sufficient to furnish each of the two ends EX1 and EX2 of the membrane with a single via, it is preferable to provide several vias on each of the two ends. This makes it possible, in particular, to reduce the electrical resistance of the set of vias and to obtain better homogeneous lines of current in the membrane.

Each of the vias V1, V2 also comes into contact with a metal track P1, P2 of the first metal level of the integrated circuit. These metal tracks and vias allow the transducer to be electrically connected. Finally, provision is conventionally made for there to be a first level of insulating material PHD, which insulates the upper surface of the substrate SB from the first metal level. Conventionally, this insulating material is, for example, a doped silicon oxide obtained from tetraethyl orthosilicate (TEOS). The metal tracks of each metal level are also conventionally coated with another insulating material IMD, for example, TEOS-derived oxide, but undoped.

In operation, a modulated current I flows in the membrane. The magnetic field B generated by the magnet, perpendicular to the lines of current I, creates a Lorenz force perpendicular to the membrane which deforms the latter depending on the amplitude of the current, thus transmitting sound (or ultrasound).

Figure 7:
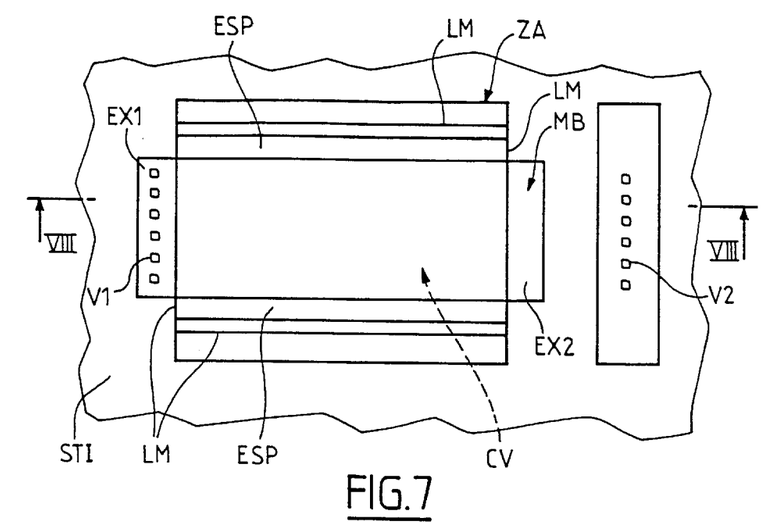
FIGS. 7 and 8 illustrate schematically an acoustic transducer, and more particularly, one that is to be incorporated into an acoustic receiver according to the present invention.
Figure 8:
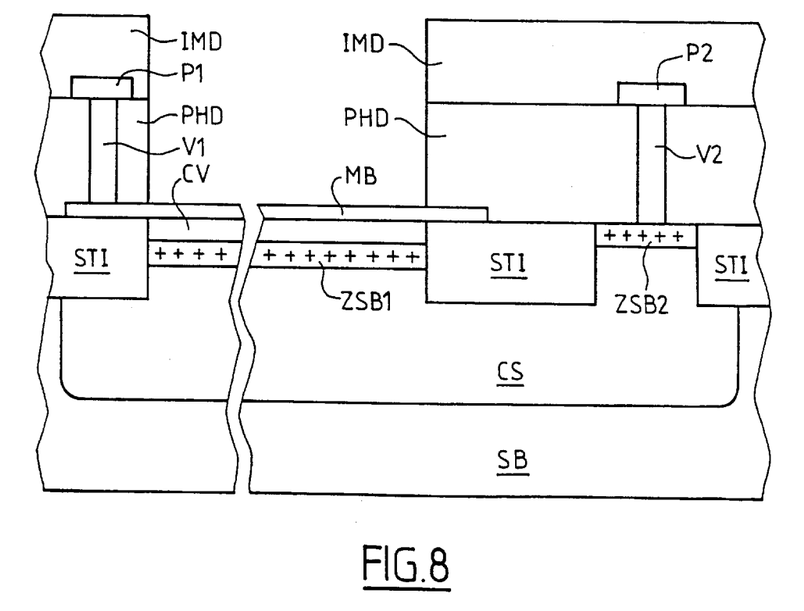

FIGS. 7 and 8 schematically illustrate an acoustic transducer incorporated into an acoustic receiver. FIG. 8 is a cross-section on the line VIII—VIII of FIG. 7. Compared with the transducer illustrated in FIGS. 5 and 6, the membrane MB of the transducer in FIGS. 7 and 8 forms a first plate of a capacitor. The doped zone ZSB1 of the semiconductor substrate, faced opposite the membrane, then forms a second plate of the capacitor. The cavity CV separating the two plates contains a layer of dielectric gas, for example, air or nitrogen.

The substrate SB, for example, a p-type substrate, includes an n-doped well CS within a first part of which the doped substrate zone ZSB1 is produced. Moreover, this well CS has another part ZSB2, also doped, which is isolated from the membrane and in contact with the via V2. The current flowing through the capacitor thus enters through the via V1, for example, and flows through the membrane and exits by way of zone ZSB1, the well CS and the zone ZSB2 by the via V2. The rest of the structure is identical to that described with reference to FIGS. 5 and 6. The reference LM denotes in FIG. 7, just as in FIG. 5, the internal boundary of the layers of insulating materials PHD and IMD.

Figure 9A:
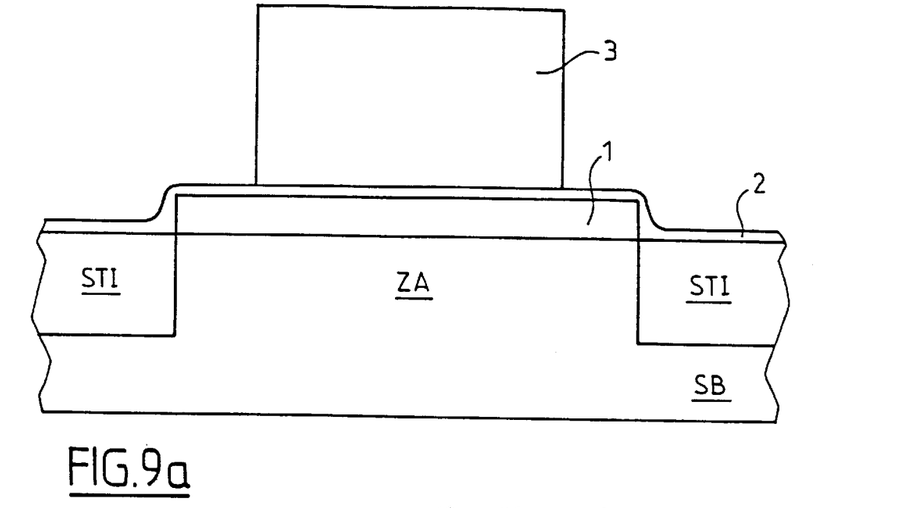
FIGS. 9a to 9d illustrate schematically the main steps of a fabrication process for obtaining an acoustic transducer according to the present invention.

The main steps of a fabrication process used for obtaining a transducer according to the invention will now be described with reference to FIGS. 9a to 9d. As shown in FIG. 9a, the active zone ZA, within which the transducer will be produced, is defined beforehand in the substrate SB by conventionally delimiting it by isolation trenches STI. Next, a layer of a first material, for example, a layer of germanium or a silicon-germanium alloy, is deposited by selective epitaxy. By way of indication, it will be possible to use as an alloy, an $Si_{1-x}Ge_x$ alloy with $0<x<1$ or else an $Si_{1-x-y}Ge_xC_y$ alloy with $0<x<0.95$ and $0<y<0.05$. An SiGe alloy having a high germanium content, and in particular, one containing 10 to 30% by weight of germanium, will preferably be used.

The epitaxy is carried out conventionally and is selective in the sense that the material 1 grows only on the silicon of the active region ZA. Next, a layer of a second material 2, for example, silicon, is deposited in a conventional manner by a non-selective epitaxy. The conditions under which the selective epitaxy and the non-selective epitaxy are carried out are well known to those skilled in the art.

A photoresistive resin mask 3, intended especially to define the geometry and the dimensions of the membrane, is also defined. Then the process continues with successive anisotropic etching operations to remove, in succession, as illustrated in FIG. 9b, a part of the silicon layer 2, then a part of the layer of material 1 and finally a part of the substrate ZA.

Figure 9B:
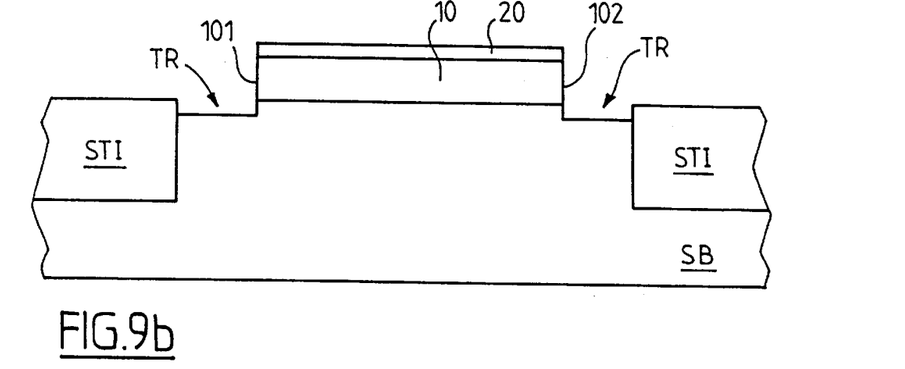

After the resin mask has been removed, as illustrated in FIG. 9b, a central stack is obtained that comprises at the top, the residual portion 20 of the silicon layer which will form the future membrane. It should be noted that this residual portion 20 of the silicon layer rests, along its two longitudinal ends (not shown in FIG. 9b), on the isolation peripheral region STI.

The central stack has a residual portion 10 of the material 1 beneath the residual portion 20. The trenches TR, made on either side of the stack right into the substrate SB, thus reveal, along the two opposed lateral sides of the stack, the side walls of the residual part 10 of the layer of the material 1.

Figure 9C:
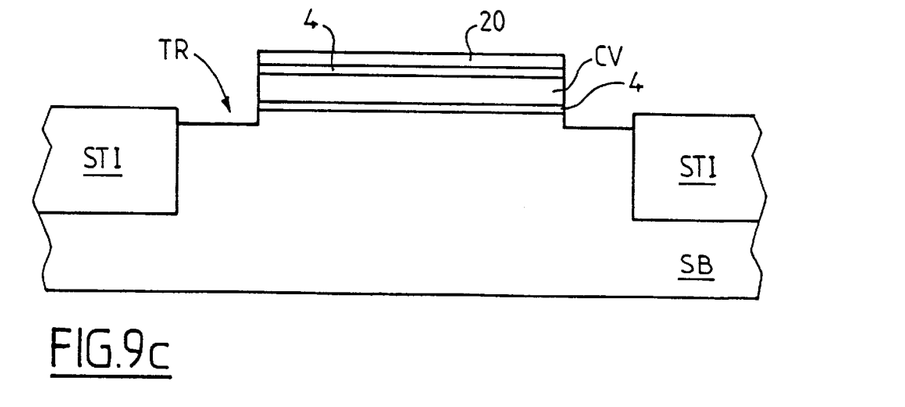

The residual portion 10 is selectively removed laterally, so as to form the cavity CV (FIG. 9c). This lateral selective etching may be carried out using one of the techniques well known to those skilled in the art, such as isotropic plasma etching or etching by means of an oxidizing chemical solution. For example, a solution containing 40 ml of 50% $HNO_3$, 20 ml of $H_2O_2$ and 5 ml of 0.5% HF may be used.

It is also possible, although this is not absolutely necessary, to form thin layers of dielectric material 4, for example, $SiO_2$, on the inner walls of the cavity CV so as to serve as a protective barrier. The process then continues with the implantation of dopants into the membrane 20 (FIG. 9d), which results in dopants penetrating into the substrate zone located opposite the membrane so as to form the doped substrate zone ZSB1.

Figures 9D, 10:
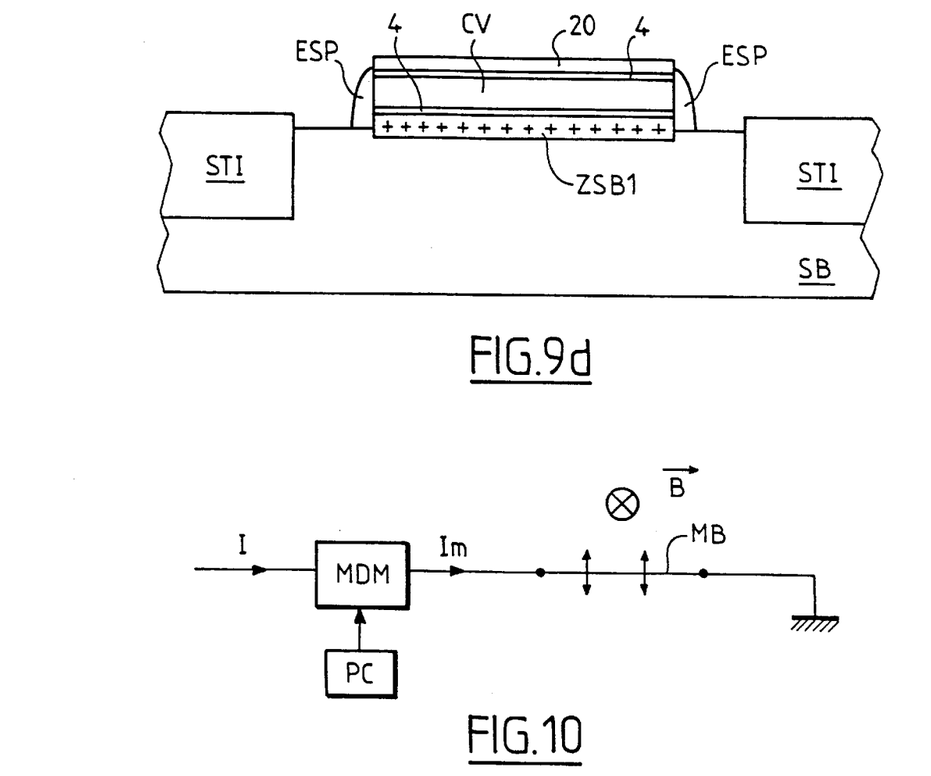
FIG. 10 illustrates schematically an electrical circuit diagram for an acoustic transmitter according to the present invention.

As a variation, it would be possible to dope the membrane in situ during the epitaxy of the layer 2. Next, the cavity CV is closed off by producing, in the bottom of the trenches TR, isolation regions (for example, made of $SiO_2$) or spacers ESP. Of course, if the transducer is intended to be used in a receiver, an implantation into the well, especially so as to form the zone ZSB2, is also carried out.

The subsequent steps in the fabrication of the transducer, such as the production of the vias and the production of the dielectric materials PHD and IMD, are carried out conventionally. The membrane has, for example, a thickness which varies from 5 to 100 nm, and preferably from 10 to 20 nm. The surface area of the membrane is, for example, on the order of 100×100 μm. The resonant frequency for these dimensions is about 30 MHz in the case of the membrane, and about 1 MHz in the case of the cavity. The speed of the sound waves is on the order of 1 cm/s for a vacuum of 0.01 torr and for a cavity height of 10 nm. Such an acoustic transducer can thus operate within a frequency range of between 1 and 30 MHz.

It is also particularly advantageous to provide a matrix MC comprising a relatively large number of ultrasonic transducers, since the acoustic power is proportional to the total surface area of the sensors. Although only a single transducer per active region ZA has been shown, it would have been possible to produce several transducers in each active region ZA by mutually isolating one transducer from another by trenches produced in the substrate, and by doping the bottom of the trenches with opposite doping to the doping of the substrate zone of the transducer located beneath the membrane.

FIG. 10 illustrates an electrical circuit diagram of an acoustic transmitter according to the invention. The control logic unit comprises, for example, a modulator MDM of conventional structure to amplitude-modulate a current I. The modulation is controlled by a control processor PC. The output from the modulator is connected to one of the terminals of the membrane MB, while the other terminal of the membrane MB is connected to ground. Under the combined action of the modulated lines of the current and of the magnetic field B, the membrane MB deforms perpendicularly to its plane due to the effect of the Lorenz force, consequently generating ultrasound which will propagate into the air by leaving via the aperture OUV in the package.

Figure 11:
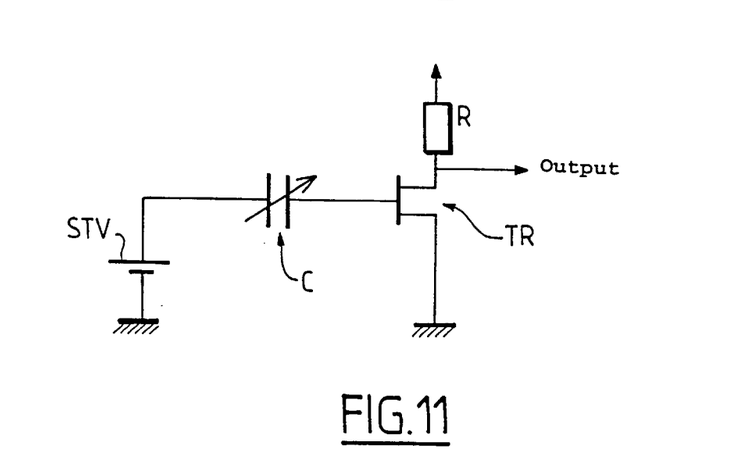
FIG. 11 illustrates schematically an electrical circuit diagram for an acoustic receiver according to the present invention.

The electrical circuit diagram illustrated in FIG. 11 is an example intended to be implemented in an acoustic receiver. One of the terminals of the capacitor of the transducer, for example, the terminal connected to the membrane, is connected to a voltage supply STV. The other electrode of the capacitor, in this case the substrate, is connected to the gate of a JFET transistor. The capacitance of the capacitor will be modulated by the mechanical deformation of the membrane generated by a pressure variation resulting from sound propagating through the open air and striking the membrane. The charge transfer between the capacitor C and the gate of the JFET transistor then induces a variation in the drain current, which is converted into a voltage by a resistor. This voltage can then be analyzed after analog-digital conversion by a signal processor.

Other means of detecting the variations in the capacitance of the capacitor are possible. In particular, an inductive-capacitive oscillating circuit or oscillator, the capacitor of which would be formed by the capacitor of the transducer, may be used. The variations in frequency of the oscillator will be representative of the variations in the capacitance of the capacitor of the transducer, and consequently, representative of the ultrasonic information received.

What is claimed is:

1. An integrated semiconductor acoustic transducer comprising:
   a semiconductor substrate comprising at least one zone defined therein; and
   a deformable semiconductor membrane opposite said at least one zone and separated therefrom by a cavity for allowing said deformable semiconductor membrane to deform based upon a force applied thereto.

2. An integrated semiconductor acoustic transducer according to claim 1, wherein the force applied to said deformable semiconductor membrane is generated by at least one of an acoustic pressure and a Lorentz force.

3. An integrated semiconductor acoustic transducer according to claim 1, wherein said semiconductor substrate comprises silicon; and wherein said deformable semiconductor membrane comprises doped silicon.

4. An integrated semiconductor acoustic transducer according to claim 1, wherein said cavity is sized to operate at ultrasonic frequencies.

5. An integrated semiconductor acoustic transducer according to claim 1, wherein said deformable semiconductor membrane has a length of about 100 micrometers; and wherein the cavity has a height of about 10 nanometers.

6. An integrated semiconductor acoustic transducer according to claim 1, wherein said at least one zone in said semiconductor substrate is doped to serve as a first capacitor electrode; wherein said deformable semiconductor membrane is also doped to serve as a second capacitor electrode; and
   further comprising a gas in the cavity separating said first and second capacitor electrodes.

7. An integrated semiconductor acoustic transducer according to claim 6, wherein the force applied to said deformable semiconductor membrane is generated by an acoustic pressure.

8. An integrated semiconductor acoustic transducer according to claim 6, further comprising an isolation region within said semiconductor substrate surrounding said at least one doped zone; and wherein said deformable semiconductor membrane includes first and second spaced apart ends extending over said isolation region.

9. An integrated semiconductor acoustic transducer according to claim 8, wherein said semiconductor substrate further comprises:
   a second doped zone adjacent a portion of said isolation region adjacent the second spaced apart end of said deformable semiconductor membrane;
   a well surrounding said at least one doped zone and said second doped zone;
   at least one first electrical contact contacting the first spaced apart end of said deformable semiconductor membrane; and
   at least one second electrical contact contacting the second doped zone of said semiconductor substrate.

10. An integrated semiconductor acoustic transducer according to claim 1, further comprising a modulator for modulating a current through said deformable semiconductor membrane; and a magnet so that the force applied to said deformable semiconductor membrane is a Lorentz force.

11. An integrated semiconductor acoustic transducer according to claim 10, wherein said deformable semiconductor membrane includes first and second spaced apart ends; and further comprising:
    an isolation region within said semiconductor substrate surrounding said at least one zone so that the first and second spaced apart ends of said deformable semiconductor membrane extend thereover;
    at least one first electrical contact contacting the first spaced apart end of said deformable semiconductor membrane; and
    at least one second electrical contact contacting the second spaced apart end of said deformable semiconductor membrane.

12. An integrated semiconductor acoustic receiver comprising:
    a semiconductor substrate comprising at least one doped zone defined therein serving as a first capacitor electrode;
    a deformable doped semiconductor membrane serving as a second capacitor electrode opposite said first capacitor electrode, and separated therefrom by a cavity for allowing said deformable doped semiconductor membrane to deform based upon a force applied thereto;
    a gas in the cavity separating said first and second capacitor electrodes;
    a current generator connected to said first capacitor electrode for generating a current through said deformable doped semiconductor membrane; and
    a detector connected to said second capacitor electrode for detecting variations in a capacitance of said capacitor caused by said deformable doped semiconductor membrane being deformed.

13. An integrated semiconductor acoustic receiver according to claim 12, wherein the force applied to said deformable doped semiconductor membrane is generated by an acoustic pressure.

14. An integrated semiconductor acoustic transducer according to claim 12, wherein said cavity is sized to operate at ultrasonic frequencies.

15. An integrated semiconductor acoustic receiver according to claim 12, further comprising an isolation region within said semiconductor substrate surrounding said at least one doped zone; and wherein said deformable doped semiconductor membrane includes first and second spaced apart ends extending over said isolation region.

16. An integrated semiconductor acoustic receiver according to claim 15, wherein said semiconductor substrate further comprises:
    a second doped zone adjacent a portion of said isolation region adjacent the second spaced apart end of said deformable doped semiconductor membrane;
    a well surrounding said at least one doped zone and said second doped zone;
    at least one first electrical contact contacting the first spaced apart end of said deformable semiconductor membrane; and
    at least one second electrical contact contacting the second doped zone of said semiconductor substrate.

17. An integrated semiconductor acoustic receiver according to claim 12, wherein said at least one doped zone comprises a plurality of doped zones each having a deformable semiconductor membrane opposite therefrom; and further comprising a package encapsulating said semiconductor substrate, said deformable semiconductor membrane, said current generator and said detector; and said package having an opening for exposing said plurality of deformable doped semiconductor membranes.

18. An integrated semiconductor acoustic transmitter comprising:
  a semiconductor substrate comprising at least one doped zone defined therein;
  a deformable semiconductor membrane opposite said at least one doped zone and separated therefrom by a cavity for allowing said deformable semiconductor membrane to deform based upon a force applied thereto;
  a current generator connected to said deformable semiconductor membrane for generating a current therethrough; and
  a force generator for generating the force being applied to said deformable semiconductor membrane.

19. An integrated semiconductor acoustic transducer according to claim 18, wherein said cavity is sized to operate at ultrasonic frequencies.

20. An integrated semiconductor acoustic transmitter according to claim 18, wherein said current generator comprises a modulator for modulating the current through said deformable semiconductor membrane.

21. An integrated semiconductor acoustic transducer according to claim 18, wherein said force generator comprises a magnet so that the force applied to said deformable semiconductor membrane is a Lorentz force.

22. An integrated semiconductor acoustic transmitter according to claim 18, wherein said magnet comprises a U-shaped magnetic having first and second arms for generating a magnetic field; and wherein said semiconductor substrate and said deformable semiconductor membrane are between the first and second arms of said U-shaped magnetic.

23. An integrated semiconductor acoustic transmitter according to claim 18, wherein said deformable semiconductor membrane includes first and second spaced apart ends; and further comprising:
  an isolation region within said semiconductor substrate surrounding said at least one doped zone so that the first and second spaced apart ends of said deformable semiconductor membrane extend thereover;
  at least one first electrical contact contacting the first spaced apart end of said deformable semiconductor membrane; and
  at least one second electrical contact contacting the second spaced apart end of said deformable semiconductor membrane.

24. An integrated semiconductor acoustic transmitter according to claim 18, wherein said at least one doped zone comprises a plurality of doped zones each having a deformable semiconductor membrane opposite therefrom; and further comprising a package encapsulating said semiconductor substrate, said deformable semiconductor membrane, said current generator and said force generator; and said package having an opening for exposing said plurality of deformable semiconductor membranes.

25. A process for fabricating an integrated semiconductor acoustic transducer comprising:
  forming at least one zone in a semiconductor substrate; and
  forming a deformable semiconductor membrane opposite the at least one zone and separated therefrom by a cavity for allowing the deformable semiconductor membrane to deform based upon a force applied thereto.

26. A process according to claim 25, wherein the cavity is sized to operate at ultrasonic frequencies.

27. A process according to claim 25, wherein forming the at least one zone comprises forming an isolation region in the semiconductor substrate surrounding the at least one zone.

28. A process according to claim 27, wherein forming the deformable semiconductor membrane comprises:
  forming a first layer on the at least one zone;
  forming a second layer on the first layer and on the isolation region, the first layer being selectively removable with respect to the second layer;
  removing a portion of the second layer, a portion of the first layer and portion of the at least one zone for forming a pair of lateral trenches in said at least one zone for defining a central stack comprising a remaining portion of the second layer, a remaining portion of the first layer and a remaining portion of the at least one zone, the central stack exposing the remaining portion of the first layer along two opposed lateral sides thereof; and
  selectively removing from the opposed lateral sides of the central stack the remaining portion of the first layer for forming the cavity bounded by the at least one zone and the remaining portion of the second layer forming the deformable semiconductor membrane.

29. A process according to claim 25, further comprising forming lateral spacers for enclosing the exposed cavity.

30. A process according to claim 28, wherein forming the first layer comprises depositing the first layer by selective epitaxy; and wherein forming the second layer comprises depositing the second layer by a non-selective epitaxy.

31. A process according to claim 28, wherein the first layer comprises at least one of germanium and a silicon-germanium alloy; and wherein the second layer comprises silicon.

32. A process according to claim 25, wherein the deformable semiconductor membrane comprises a doped semiconductor material.

33. A process according to one claim 25, wherein the at least one zone is doped.

34. A process according to claim 25, further comprising oxidizing internal walls of the cavity.

* * * * *